(12) United States Patent
Haran

(10) Patent No.: US 11,312,386 B2
(45) Date of Patent: Apr. 26, 2022

(54) SYSTEM AND METHOD FOR DRIVER RISK GRADING BASED ON VEHICLE-TO EVERYTHING (V2X) COMMUNICATION

(71) Applicant: Autotalks Ltd., Kfar Netter (IL)

(72) Inventor: Onn Haran, Bnei Dror (IL)

(73) Assignee: Autotalks Ltd., Kfar Netter (IL)

( * ) Notice: Subject to any disclaimer, the term of this patent is extended or adjusted under 35 U.S.C. 154(b) by 0 days.

(21) Appl. No.: 17/092,890

(22) Filed: Nov. 9, 2020

(65) Prior Publication Data

US 2021/0253113 A1    Aug. 19, 2021

Related U.S. Application Data

(60) Provisional application No. 62/978,588, filed on Feb. 19, 2020.

(51) Int. Cl.
*B60W 40/09* (2012.01)
*H04W 4/40* (2018.01)
(Continued)

(52) U.S. Cl.
CPC ............ *B60W 40/09* (2013.01); *G01C 21/36* (2013.01); *G07C 5/085* (2013.01); *H04W 4/40* (2018.02);
(Continued)

(58) Field of Classification Search
CPC ............ B60W 40/09; B60W 2540/30; B60W 2556/65; G01C 21/36; G07C 5/085; H04W 4/40; H04W 4/46; G06Q 40/08; G06Q 50/30; G08B 25/00; G08G 1/096716; G08G 1/096741; G08G 1/09675; G08G 1/096775; G08G 1/096791
See application file for complete search history.

(56) References Cited

U.S. PATENT DOCUMENTS 8,686,844 B1    4/2014 Wine
9,147,353 B1 *  9/2015 Slusar ................... G06Q 40/08
(Continued)

*Primary Examiner* — Ryan W Sherwin
(74) *Attorney, Agent, or Firm* — Nathan & Associates; Menachem Nathan

(57) ABSTRACT

System for evaluating driver risk, comprising a local V2X communication unit for transmitting at least one attribute from a self-vehicle to remote vehicles and for receiving in the self-vehicle at least one attribute from each of the remote vehicles, the self-vehicle and the remote vehicles having respective drivers, a local unsafe act detection unit configured to detect at least one unsafe act of the self-vehicle and to report the at least one unsafe act, and a centralized driver behavior-grading unit configured to process the reported at least one unsafe act, to grade the driver of the self-vehicle for risk, and to output a respective self-vehicle driver risk grade. A method performed using the system comprises checking if the remote vehicle had a major speed decrease in a recent given time period, if yes, checking if the self-vehicle influences the remote vehicle, if yes, checking respective speed patterns of the self-vehicle and of the remote vehicle for patterns typical for at least one unsafe act, if patterns typical for at least one unsafe act are found, grading the at least one unsafe act, and based on the grading the at least one unsafe act, grading the driver of the self-vehicle for risk.

12 Claims, 8 Drawing Sheets

(51) Int. Cl.
  *G07C 5/08* (2006.01)
  *G01C 21/36* (2006.01)
(52) U.S. Cl.
  CPC ..... *B60W 2540/30* (2013.01); *B60W 2556/65* (2020.02)

(56) References Cited

U.S. PATENT DOCUMENTS

| | | |
|---|---|---|
| 9,715,711 B1 | 7/2017 | Komrardy et al. |
| 10,166,934 B2 | 1/2019 | Nemat-Nasser et al. |
| 10,449,967 B1 * | 10/2019 | Ferguson ................ G07C 5/008 |
| 2020/0057487 A1 | 2/2020 | Sicconi et al. |
| 2020/0225676 A1 * | 7/2020 | Telpaz .................. B60W 40/09 |

* cited by examiner

SYSTEM AND METHOD FOR DRIVER RISK GRADING BASED ON VEHICLE-TO EVERYTHING (V2X) COMMUNICATION

CROSS REFERENCE TO RELATED APPLICATIONS

This application claims priority from U.S. Provisional Patent Application No. 62/978,588 filed Feb. 19, 2020, which is expressly incorporated herein by reference in its entirety.

FIELD

Embodiments disclosed herein relate generally to driver risk grading using vehicle-to-everything (V2X) communications.

BACKGROUND

Usage-Based-Insurance (UBI) tailors insurance costs according to driver's risk. At this time, the ability for risk grading is very limited, hence rarely used. Existing vehicle loggers may indicate excessive accelerations and braking events, but those do not translate directly to the risk imposed by a driver. For example, a driver may press hard on the gas pedal when the traffic-light turns green, but other drivers will not be put at risk, while on the other hand a slow driver may cut a lane carelessly while maintaining a stable slow speed, which would greatly increase risk to other drivers.

Although an accident is a rare statistical event, too uncommon for use in risk grading, it is currently the top criterion for setting the insurance premium. That is, risk grading is essential for differential insurance premium payment. Alternatively, one can use for risk grading the theorem of accident triangle, also known as Heinrich's triangle or Bird's triangle, as it considers also near-misses and unsafe acts. The theorem posits that for every fatality there are 10 major accidents, 30 minor accidents, 600 near-misses and an undisclosed number of unsafe acts. Unsafe acts are not rare statistical events, and dangerous drivers can be identified with fine granularity. Examples of unsafe acts include sudden braking or deceleration, dangerous lane change, right-of-way violation, etc.

It seems reasonable to assume that the only way to measure risk created by a driver is by analyzing his/her influence on actions of other road users. Nothing is more suitable for that than V2X communication, which provides comprehensive data from other connected vehicles in proximity. V2X penetration is expected to be sufficient within a few years, allowing detection of many unsafe acts.

Privacy laws are uncompromising regulatory requirements. The identity of drivers and vehicles is unknown in V2X communications. A vehicle cannot report risk imposed by other vehicles. It can only report itself.

There is therefore a need for, and it would be advantageous to have a system and method for driver risk grading based on V2X communications.

SUMMARY

In various embodiments, there are provided systems for evaluating driver risk, comprising: a local V2X communication unit for transmitting at least one attribute from a self-vehicle to remote vehicles and for receiving in the self-vehicle at least one attribute from each of the remote vehicles, the self-vehicle and the remote vehicles having respective drivers; a local unsafe act detection unit configured to detect at least one unsafe act of the self-vehicle and to report the at least one unsafe act; and a centralized driver behavior-grading unit configured to process the reported at least one unsafe act, to grade the driver of the self-vehicle for risk, and to output a respective self-vehicle driver risk grade.

In an exemplary embodiment, the local unsafe act detection unit includes a first classifier operative to classify a remote vehicle that is directly influenced by the self-vehicle, and a second classifier operative to classify at least one self-vehicle unsafe act without using a map, which classification of the at least one self-vehicle unsafe act indicates if at least one attribute received from the remote vehicle directly influenced by the self-vehicle is changed due to the at least one self-vehicle unsafe act.

In an exemplary embodiment, the centralized driver behavior-grading unit includes a centralized driver grading module operative to weight unsafe acts for grading the driver of the self-vehicle and for outputting a self-vehicle driver risk grade.

In an exemplary embodiment, a system further comprises an in-vehicle logging unit that runs a log of self-vehicle.

In an exemplary embodiment, a system further comprises a third classifier operative to use map data to obtain right-of-way data to reclassify the self-vehicle reported unsafe act.

In an exemplary embodiment, the centralized driver behavior-grading unit includes a centralized driver grading module operative to weight unsafe acts for grading the driver of the self-vehicle and for outputting a self-vehicle driver risk grade.

In an exemplary embodiment, the first classifier includes a first module operative to identify when the self-vehicle crosses a path of another vehicle and to output a first output.

In an exemplary embodiment, the first classifier further includes a potential interaction unit operative to combine one or more of the first, second and third outputs and to issue an indication when one of the respective modules identifies a potential influenced vehicle.

In an exemplary embodiment, the detection of the at least one unsafe act is based on a speed pattern.

In an exemplary embodiment, the first classifier further includes a second module operative to identify when the self-vehicle enters a lane ahead of the remote vehicle and to output a second output.

In an exemplary embodiment, the first classifier further includes a third module operative to identify when the self-vehicle enters an opposite lane while a remote vehicle is driving in the opposite lane and to output a third output.

In an exemplary embodiment, there is provided a method for evaluating driver risk, comprising: in a self-vehicle communicating with a remote vehicle via V2X communications, the self-vehicle and the remote vehicle having respective drivers, checking if the remote vehicle had a major speed decrease in a recent given time period; if yes, checking if the self-vehicle influences the remote vehicle; if yes, checking respective speed patterns of the self-vehicle and of the remote vehicle for patterns typical for at least one unsafe act; if patterns typical for at least one unsafe act are found, grading the at least one unsafe act; and based on the grading the at least one unsafe act, grading the driver of the self-vehicle for risk. The method may further comprise, if the patterns typical for at least one unsafe act are found, declaring the at least one unsafe act and logging the at least one unsafe act in a log, and checking all unsafe acts logged in the log and ignoring unsafe acts where the self-vehicle has right-of-way based on a map.

BRIEF DESCRIPTION OF THE DRAWINGS

Non-limiting examples of embodiments disclosed herein are described below with reference to drawings attached hereto that are listed following this paragraph. Identical structures, elements or parts that appear in more than one drawing may generally be labeled with the same numeral. The drawings and descriptions are meant to illuminate and clarify embodiments disclosed herein, and should not be considered limiting in any way. In the drawings.

DETAILED DESCRIPTION

In various disclosed examples, a new concept is presented to detect and grade risk imposed by a self-driver (driver of a self-vehicle) on other drivers using information received through V2X communications. The main idea is to detect if another vehicle had to brake due to an unsafe act of the self-vehicle. That is, breaking is used as a criterion (indication) for the unsafe act of the self-vehicle.

Two examples of unsafe acts are illustrated with reference to FIGS. 1A and 1B.

Figure 1A:
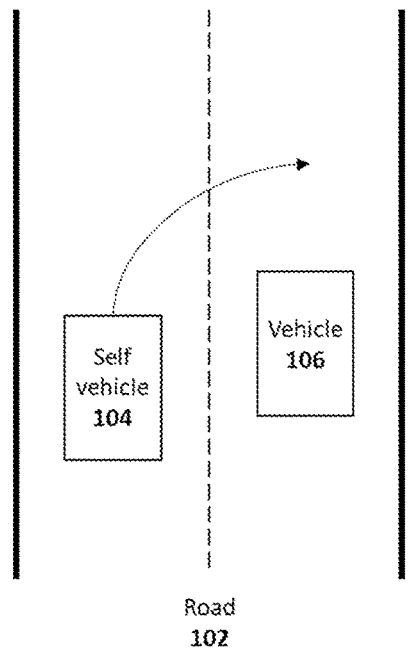
FIG. 1A illustrates a scenario of a dangerous lane change.

FIG. 1A shows a straight road 102, with a self-vehicle 104 driving in the left lane and another vehicle 106 driving in the right lane. In this example, self-vehicle 104 changes lane to the right abruptly, causing discomfort to the vehicle 106, which has to brake to prevent hitting self-vehicle 104.

Figure 1B:
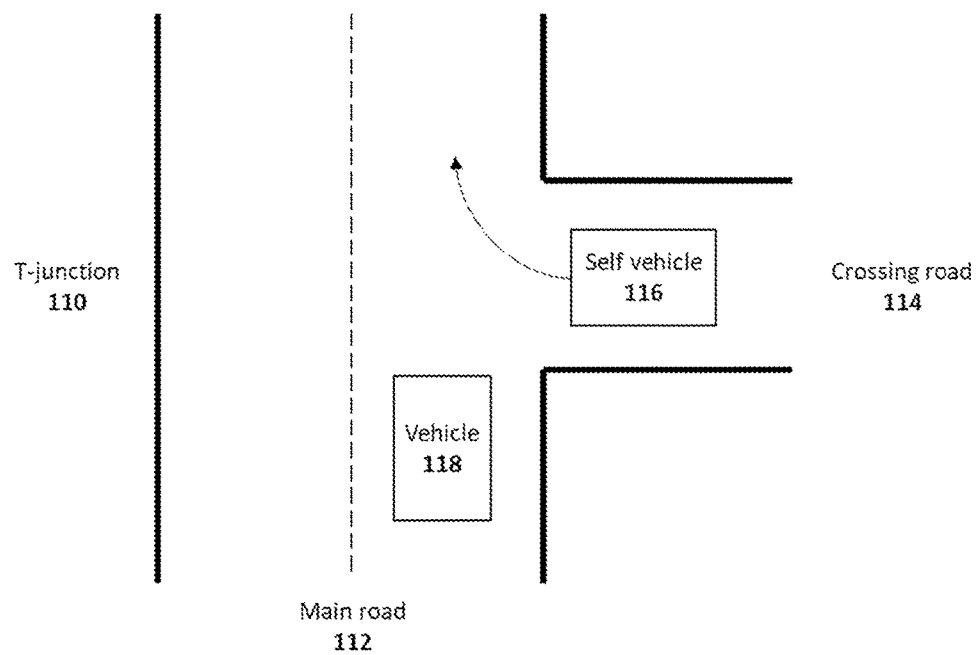
FIG. 1B illustrates a scenario of a right-of-way violation.

FIG. 1B shows a T-junction 110 with a straight main road 112 and a crossing road 114. Any vehicle on crossing road 114 is supposed to yield to vehicles on main road 112. However, in the example, a self-vehicle 116 bursts into main road 112 while another vehicle 118 is driving straight on main road 112. Again, vehicle 118 has to brake to prevent an accident.

Not all braking events indicate unsafe acts. Some breakings are justified, as shown in the next (third) example.

Figure 1C:
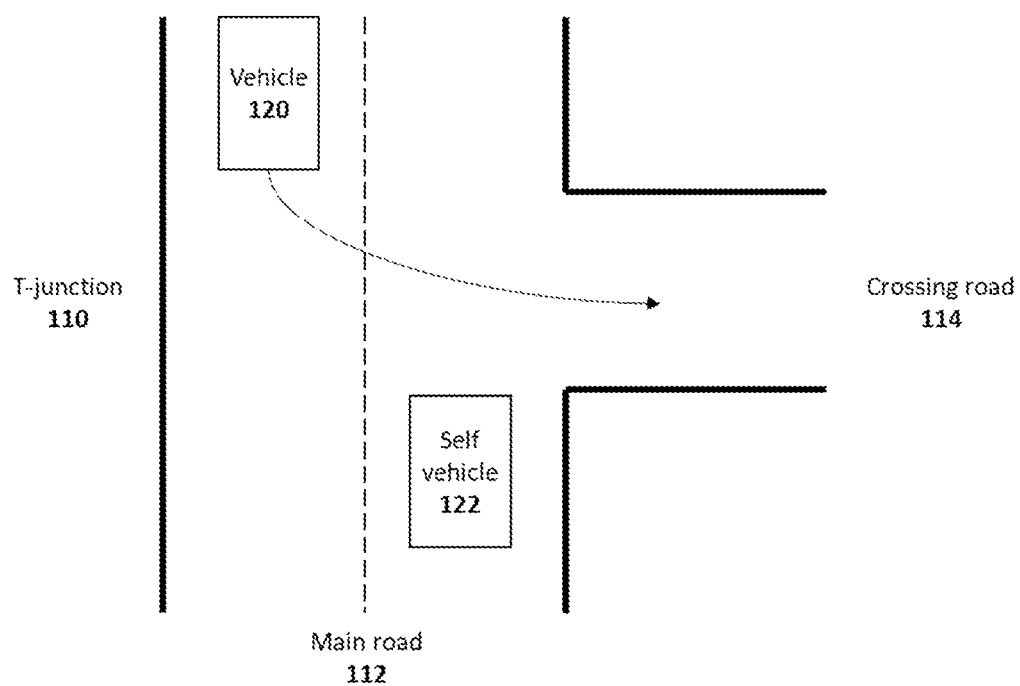
FIG. 1C illustrates a scenario of a correct right-of-way.

FIG. 1C shows an example in which approaches a vehicle 120 driving on main road 112 approaches T-junction 110 and brakes to slow down as it plans to turn left into crossing road 114, while a self-vehicle 122 drives in the opposite lane and continues straight. As in the previous two examples, the self-vehicle actions cause braking by another vehicle. Hereinbelow, only braking events of such "another vehicles" (due to self-vehicle actions will be considered.

Figure 2A:
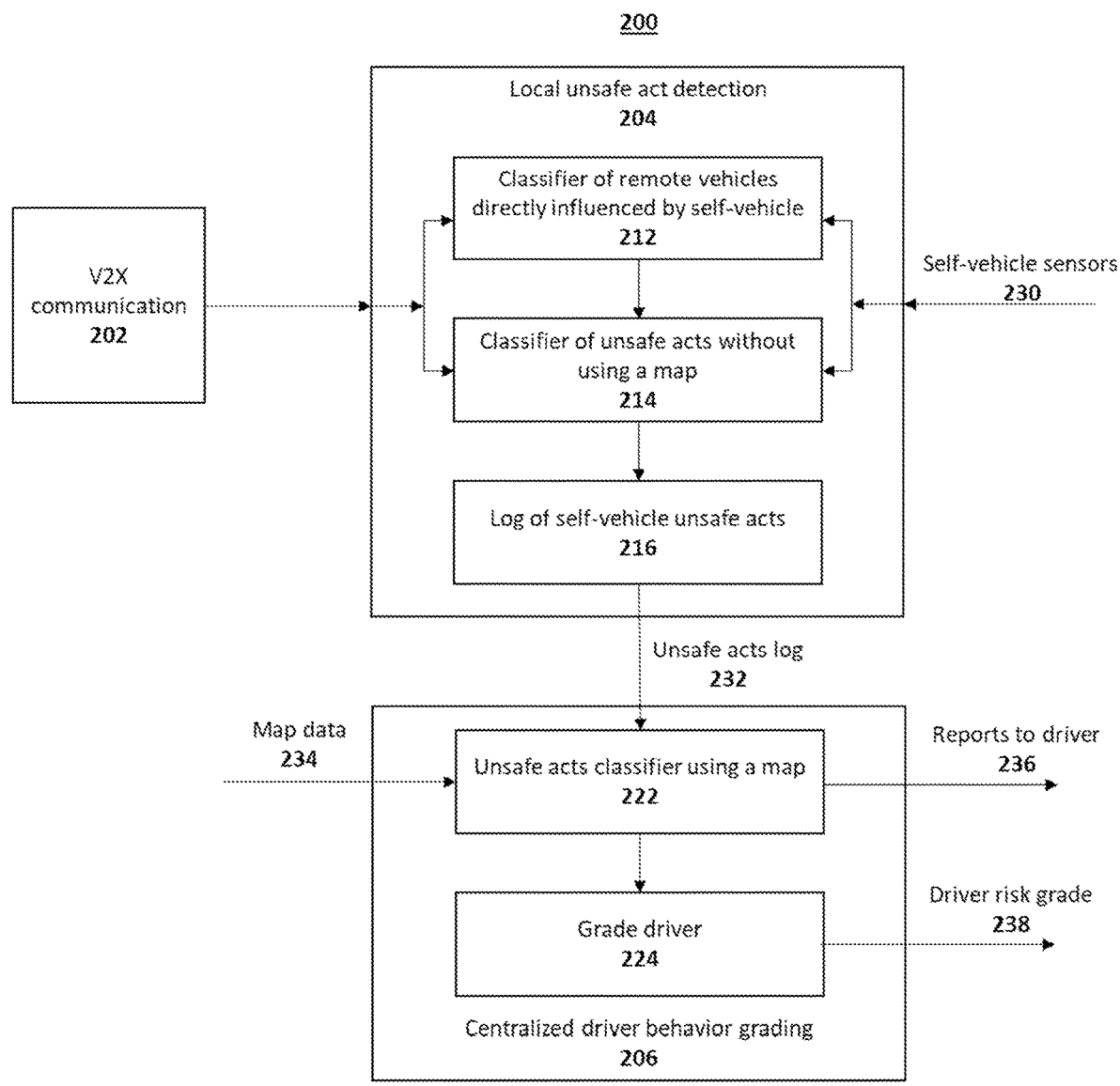
FIG. 2A illustrates a block diagram of driver risk grading system without using a map in the vehicle.

FIG. 2A illustrates in a block diagram an example of a first embodiment of a risk grading system numbered 200 disclosed herein. System 200 comprises two sets of components, a first set of components included in the self-vehicle (i.e. "local" or "in-vehicle") and functioning without use of a map, and a second one set of components located in a centralized server, and functioning with use of a map. It is advantageous to have two sets of components, for simplifying the component inside the vehicle, at the expense of more complicated components in a centralized server. The term "local" indicates that the component is located (included) in each vehicle. In this embodiment, the risk grading is done without using a map.

In the following description, in which various system components are described as having respective functionalities or as performing various functions or actions, each such component can be considered to be "operative" to perform the respective function or action, or to be "configured" or "configurable" to perform the respective function or action.

System 200 includes a local V2X communication unit 202 (implemented in hardware), a local unsafe act detection unit 204 and a centralized driver behavior-grading unit 206. The term "centralized" indicates that the component is located in a centralized server (and not in a vehicle). In some embodiments, unit 204 includes a first classifier 212, a second classifier 214 and a logging unit 216. In some embodiments, centralized driver behavior grading unit 206 includes a third classifier 222 and a driver grading module 224. Third classifier 222 may be optional. Driver grading module 224 functions using a map.

V2X communication unit 202 transmits attributes of a self-vehicle such as location, speed and heading, and receives the same information from other vehicles. The received information is fed into local unsafe act detection unit 204. First classifier 212 classifies other (or "remote") vehicles directly influenced by the self-vehicle, which classification indicates if movement of a "remote" vehicle can be impacted by the self-vehicle, see more details with reference to FIG. 3. Second classifier 214 classifies unsafe acts without using a map, which classification indicates if attributes of remote vehicles, in particular speed reduction, are changed due to self-vehicle actions, which can reveal an unsafe act, see more details with reference to FIG. 4. Logging unit 216 runs a log 232 of self-vehicle unsafe acts. Unit 204 receives as inputs self-vehicle sensors data 230 containing self-position, heading and speed. These inputs are used by classifiers 212 and 214. Log 232 is transmitted to centralized driver behavior grading unit 206 (and in particular to a third classifier 222, through a V2X or cellular communication link.

Classifier 222 is a classifier that uses map data 234 (see FIG. 6) to obtain (determine) right-of-way data to reclassify the self-vehicle reported unsafe act. Classifier 222 determines if the speed reduction, detected by classifier 214, is considered to be an unsafe act. Classifier 214 uses the inputs provided to it to for classification further described with reference to FIG. 4, and sends the classification results to logging unit 216, which provides the results (log 232) to classifier 222. The unsafe acts in log 232 are optionally reported to the driver in a report 236, to explain the changes in the insurance premium, and to teach which acts should be avoided. Driver grading module 224 weights all unsafe acts, grades the driver for risk, and outputs a driver risk grade 238, which may be used to determine the self-driver insurance premium.

Note that a driver can voluntarily opt-in to report his/her risky driving behavior in return for reduced insurance costs, hence privacy is not violated. Existing UBI equipment already logs driver location and driving patterns, so recording the risks does not reveal any additional driver habits and actions.

The higher number of unsafe acts, the higher the risk imposed by the driver. For example, a driver who had five major unsafe acts in a month involving major braking events by the other vehicle, is five times riskier than another driver who had only a single unsafe act. An act that involves a minor braking event has a lower impact on grade than an act that involves a major braking event. For example, five acts involving a minor braking event may be equal to a single act of a major braking event. The latter exemplifies a "weighting" of unsafe acts.

Figure 2B:
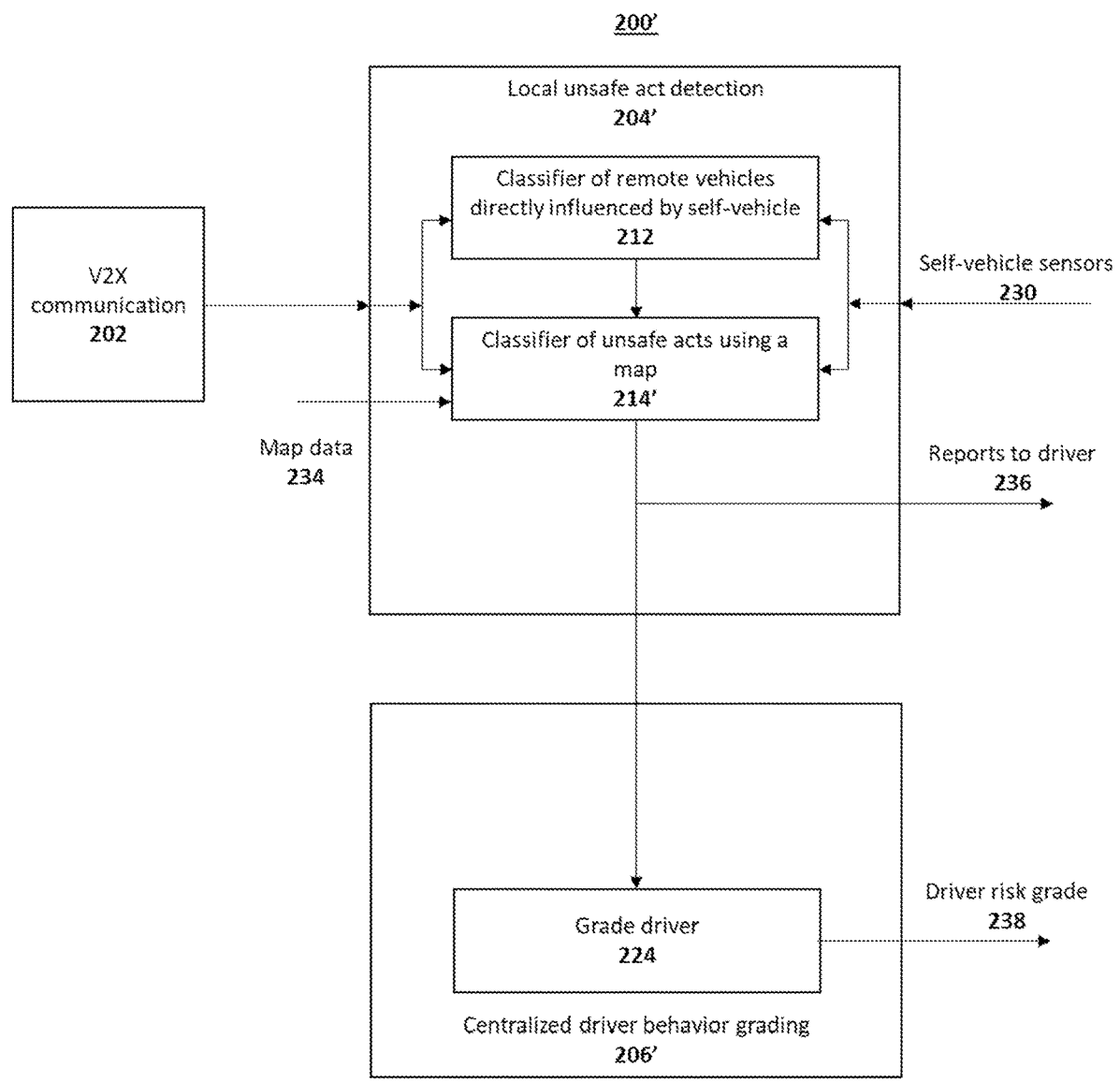
FIG. 2B illustrates a block diagram of driver risk grading system with using a map in the vehicle.

FIG. 2B illustrates in a block diagram an example of another embodiment of a risk grading system numbered 200' disclosed herein. System 200' shares many components with system 200 but includes a another embodiment of a classifier 214' that uses map data 234 and another embodiment of a centralized driver behavior-grading module 206' that includes now only driver grading module 224. In this example, the vehicle third classifier 222, logging unit 216 and log 232 are not needed, as a local modified unsafe act detection unit 204' sends unsafe acts reports 236 in real-time to the driver and to driver grading module 224 using a constantly available data link, for example cellular. The real-time reports to the driver provide feedback while the behavior is fresh in the driver's mind, and this improves safety.

Figure 2C:
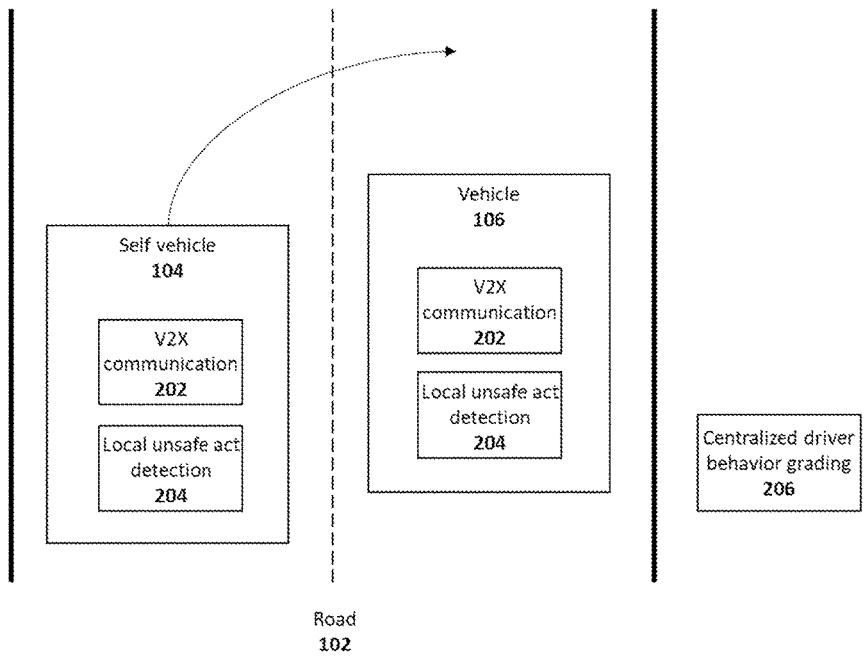
FIG. 2C illustrates a block diagram of vehicles having driver risk grading systems.

FIG. 2C illustrates a block diagram of vehicles having driver risk grading systems. The vehicles of FIG. 1A, 104 and 106, include V2X communication 202 units and local unsafe act detection 204 units. Both vehicles transmit the unsafe act logs to centralized driver behavior grading unit 206.

Figure 3:
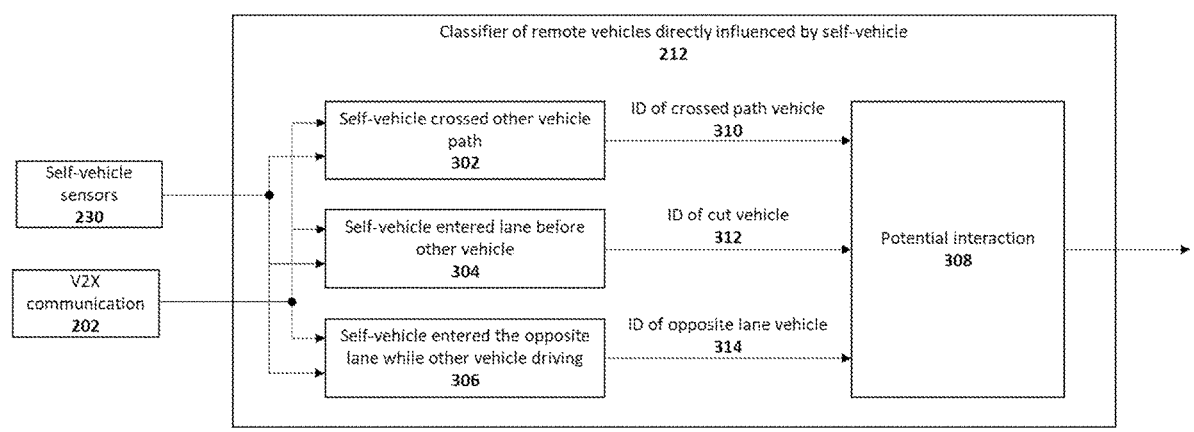
FIG. 3 illustrates a block diagram of remote vehicle influence determination.

FIG. 3 illustrates a block diagram of remote vehicle influence determination, representing a zoom-in on classifier 212. Classifier 212 includes modules (or "blocks") 302, 304, 306 and 308, all of which have software (SW) running on hardware (HW). Each of modules or blocks 302, 304 and 306 receives as inputs self-vehicle sensors data 230 and data from V2X communication unit 202 and identifies a particular/specific driving scenario. The block outputs, 310, 312 and 314 are the vehicle IDs of the other vehicles involved in the classified driving scenario.

In use in a first driving scenario (related to FIG. 1A), block 304 is operative to identify when a self-vehicle enters a lane ahead of another vehicle. The lane entrance could be from either left or right, as a result of lane change or merge. The identification or classification is based on validating that two vehicles (i.e. the self-vehicle and another vehicle) are currently driving in the same lane, while previously driving in different lanes. Accurate positioning, i.e. 1.5 m error positioning error is required to distinguish lanes, assuming that normal lanes with 3.6 m width. Similar to the first driving scenario, the interaction is conditioned by a proximity threshold (in this case a time threshold), for example 3 seconds of driving. The qualification of this case does not depend on right-of-way, because when even when the vehicle has right-of-way it is not expected to risk a driver behind it. Output 312 indicates the ID of the other vehicle, for example 106 as illustrated in FIG. 1A.

In use in a second driving scenario (related to FIG. 1B), block 302 is operative to identify when the self-vehicle crosses another vehicle path. For example, both self-vehicle and other vehicle are moving straight toward an intersection from two different perpendicular roads. The two vehicles do not drive on the same road, but do interact with each other, as one would have to yield to the other. Multiple methods can detect this scenario, and the simplest and most reliable one is to detect crossing vehicle paths, while validating that the vehicles are not driving on the same roads. The vehicles need to be close to each other (i.e. fulfill a "proximity threshold"—in this case a distance threshold), for example no more than 30 meters, to declare that they actually influence each other.

Output 310 of block 302 (i.e. an ID that the other vehicle's path was crossed) may be refined if map data is available. If the self-vehicle has right-of-way, for example, 4-way stop or driving inside a roundabout, then the impact on the other vehicle can be ignored since the other vehicle is expected to stop. However, if the self-vehicle does not have an exclusive right-of-way, then braking imposed on the other vehicle indeed indicates an unsafe act.

In use in a third driving scenario, block 306 is operative to identify when the self-vehicle enters an opposite lane while a remote vehicle is driving in it. The remote vehicle in opposite direction would occupy at a later time the road piece currently occupied by the self-vehicle. To determine which of the vehicles entered the other vehicle lane, steering corrections are maximized (meaning maximal steering wheel angle to the right and the left) during the road segment. The vehicle with higher steering correction is the one that has changed lanes, hence entered the second vehicle lane. Output 314 indicates the ID of the other vehicle.

For example, both vehicles are driving on a straight road. One vehicle keeps the steering straight, thus zero steering corrections. The other vehicle, switches to the lane and then switches back. The steering correction is high for both the right and left directions. The concept also works at a curve. A vehicle in-lane has a constant steering angle, either left or right. However, the other vehicle, which entered the opposite lane, needs to vary the steering angle to correct its lane, overall having greater steering changes than the vehicle which kept a stable curve, Map availability would assist to filter events where actually the road has a physical obstacle separating between opposite lanes, hence the scenario is impossible, probably resulting from positioning error.

Outputs of 302, 304 and 306 are reflected forward to "potential interaction" block 308, which combines the outputs and issues an indication when one of the blocks identifies a potential influenced vehicle. The combination reflects an "OR" function. Specifically, block 308 outputs the ID of the vehicle involved in the scenario and the name of the identified scenario.

Figure 4:
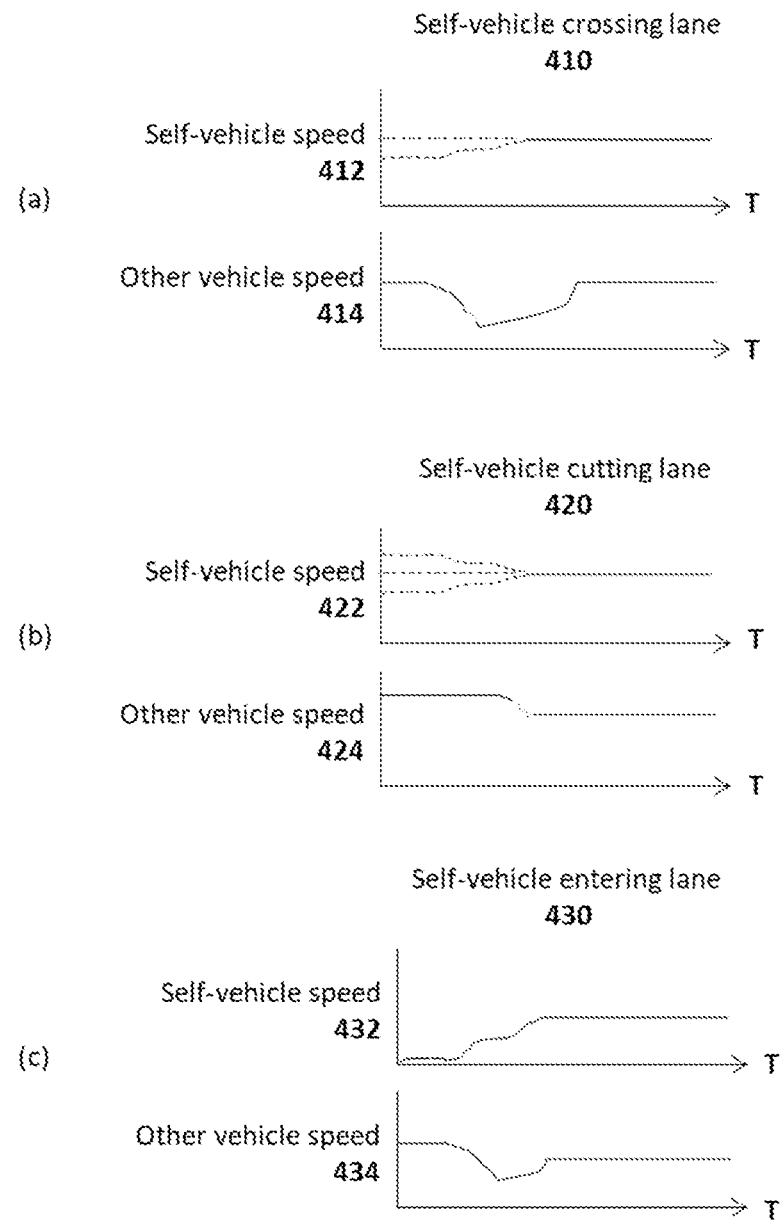
FIG. 4 illustrates risk-induced speed change patterns.

FIG. 4 illustrates the potential speed change patterns for each of the scenarios described in FIG. 3. Each graph illustrates vehicle speed vs time T.

In the first scenario (a), crossing of a lane by a self-vehicle 410 with a speed pattern 412 has an impact on the speed 414 of another vehicle, which other vehicle speed pattern is expected to drop (potentially even to a full stop) and then increase again after the self-vehicle passes. Self-vehicle speed pattern 412 is drawn with a dotted line, as it can take many shapes, as long as the self-vehicle is increasing or maintaining the speed. A significant (e.g. higher than 10 km/h) speed drop indicates self-vehicle awareness to the upcoming intersection, decreasing the probability of an unsafe act.

In the second scenario (b), cutting of a lane by a self-vehicle 420 with a speed pattern 422 causes a decrease in the speed 424 of another vehicle, followed by some increase in the speed pattern 424 after the cut was performed. Speed pattern 424 may be even aligned to self-vehicle speed 422, as indicated by a small difference (e.g. below 10%) between the speeds of the two vehicles. The self-vehicle speed pattern 422 prior to the cutting can be any arbitrary value.

In the third scenario (c), in which a self-vehicle 430 enters a lane, there is a concurrent increase in the self-vehicle speed 432 and a decrease in the other vehicle speed 434, with a later on alignment between the speed patterns of the two vehicles.

Figure 5:
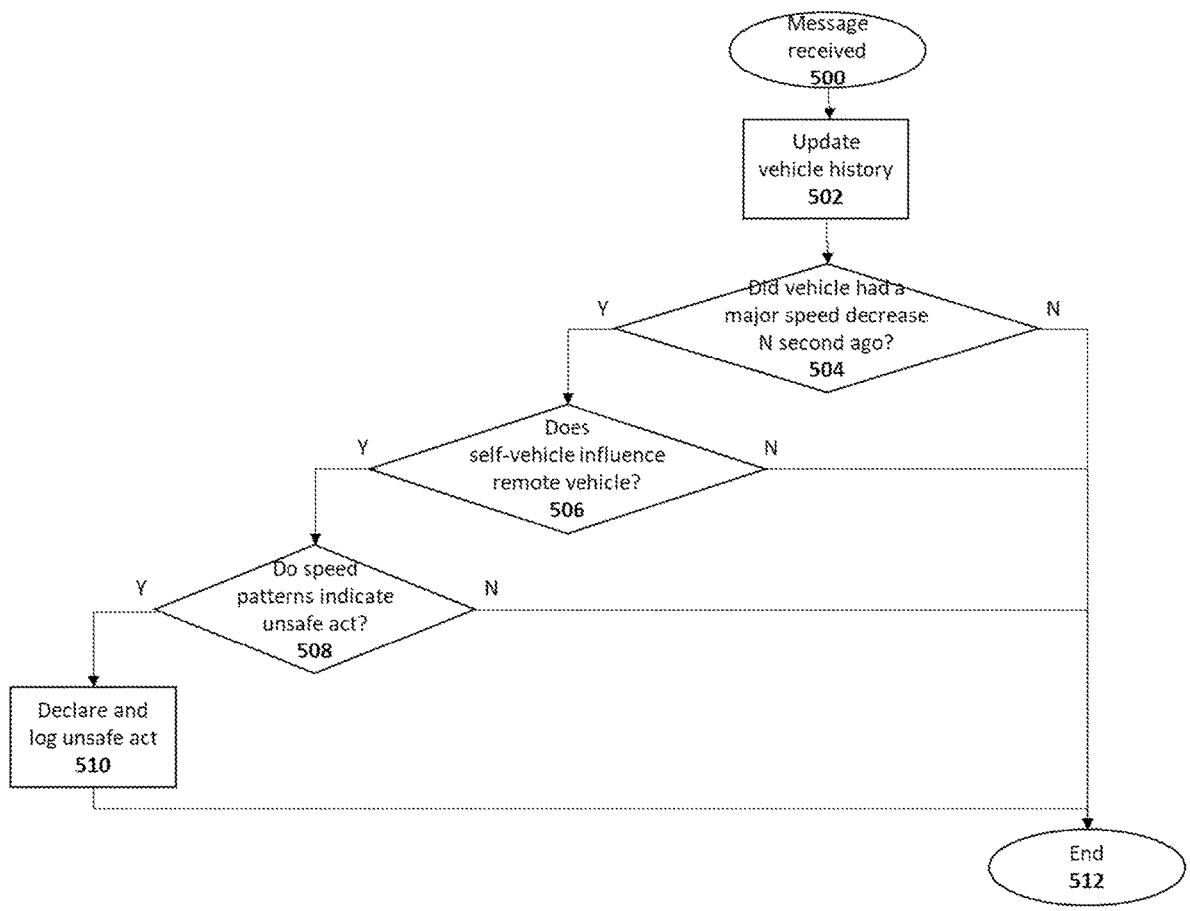
FIG. 5 illustrates a flow chart of local unsafe act detection.

FIG. 5 illustrates the flow chart of a local unsafe act detection, i.e. a more detailed description of the operation of block 204. The described flow-chart operation is performed in block 204, running in the self-vehicle. Operation begins at step 500 when a message is received from a remote vehicle nearby. In step 502, the remote vehicle history is updated, storing location, speed and heading. The history is limited to M seconds, thus older entries are deleted. M can be, for example, 8 seconds. Next, in step 504, a check is made if the remote vehicle had a major speed decrease in a recent given time period, for example in the last N seconds. Major speed decrease can be quantified for example as 10 km/h in 0.5 sec. N can be for example 5 seconds. This assures that the entire scenario is available for the following steps in the flow chart. The detection delay is acceptable, since the use of the log is not real-time. If the check is negative, the operation moves to end in step 512. Otherwise, in step 506, the remote vehicle and the self-vehicle are checked for influence (i.e. for the potential ability of the self-vehicle to influence the remote vehicle). For example, the remote vehicle may be 5 meters ahead, but the self-vehicle cannot influence the remote vehicle driving, since the self-vehicle is behind it. On the other hand and in another example, remote vehicles in crossing roads may be influenced even if they are farther apart than 30 meters (but are within 3 seconds of reaching each other while driving at current speed). The check in step 506 compares the relative movement between the self-vehicle and the remote vehicle according to the scenarios described in FIG. 3, i.e. checks if the self-vehicle has the potential to impact the speed of the remote vehicle. If the check is negative, the operation moves to end in step 512. Otherwise, in step 508, the speed patterns of both remote vehicle and self-vehicle are checked for patterns typical for unsafe acts (e.g. by matching the speed patterns described with reference to FIG. 4). The patterns typical for unsafe acts can be compared using Machine Learning (ML) algorithms, but simpler implementations are possible as well, by just comparing the time and extent of speed gradients to predefined thresholds. For example, the remote vehicle decreased its speed by more than 10 km/h in 0.5 seconds, while the remote vehicle is nearby to the self-vehicle and influenced by it. If the check is negative, the operation moves to end in step 512. Otherwise, an unsafe act is declared and logged in step 510. The log contains the entire history of self-vehicle and of the remote vehicle during the last M seconds, along the classifications of the scenarios. That log is useful for further screening at the centralized server, and teaching the drivers which acts to avoid. Later, operation ends in step 512.

Figure 6:
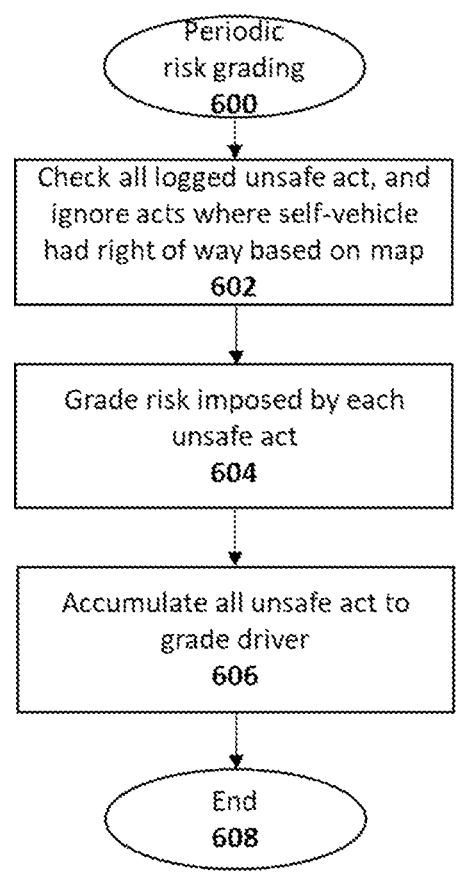
FIG. 6 illustrates a flow chart of centralized driver grading.

FIG. 6 illustrates the flow chart of centralized driver grading, i.e. more details of the actions of classifier 222 and driver grading module 224. The operation is performed in block 206, running in a server, possibly in the cloud. The operation begins in step 600 periodically, for example once a month. In step 602, all logged unsafe acts are checked, and those in which the self-vehicle had right-of-way and the other vehicle was supposed to slow down, are deleted. Map data is used to determine right-of-way. The most common cases for unsafe act deletion are 4-way stop and roundabouts, where the self-vehicle may turn while the other (remote) vehicle, continuing straight, has to wait. In step 604, the unsafe acts are graded. The higher the speed decrease, absolute and relative, the higher the risk grade of the unsafe acts. In step 606, all unsafe acts are accumulated into "accumulated unsafe act" information. The driver risk grade is determined from the accumulated unsafe act information, and can be exhibited on a scale, for example from 0-10, where 0 represents a safe act or behavior and 10 represents an extremely unsafe act or behavior. That is, there is first grading of the unsafe acts and then, based on the grades of the unsafe acts, grading of the driver risk. Operation ends at step 608.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

It is appreciated that certain features, which are for clarity described in the context of separate embodiments or example, may also be provided in combination in a single embodiment. Conversely, various features, which are for brevity described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Citation or identification of any reference in this application shall not be construed as an admission that such reference is available as prior art to the present application.

What is claimed is:

1. A system for evaluating driver risk, comprising:
   a local vehicle-to-everything (V2X) communication unit for transmitting at least one attribute from a self-vehicle to remote vehicles and for receiving in the self-vehicle at least one attribute from each of the remote vehicles, the self-vehicle and the remote vehicles having respective drivers;
   a local unsafe act detection unit configured to detect at least one self-vehicle unsafe act and to output the at least one self-vehicle unsafe act as a first output;
   a classifier of unsafe acts operative to use the first output and map data to obtain right-of-way data to classify the first output into a respective classified at least one self-vehicle unsafe act, and to output the classified at least one self-vehicle unsafe act as a second output; and
   a centralized driver behavior-grading unit configured to process the classified at least one self-vehicle unsafe act into a processed classified at least one self-vehicle unsafe act, to grade the driver of the self-vehicle for risk based on the processed classified at least one self-vehicle unsafe act, and to output a respective self-vehicle driver risk grade.

2. The system of claim 1, wherein the local unsafe act detection unit includes an additional classifier operative to classify a remote vehicle that is directly influenced by the self-vehicle, which classification of the at least one self-vehicle unsafe act indicates if at least one attribute received from the remote vehicle directly influenced by the self-vehicle is changed due to the at least one self-vehicle unsafe act.

3. The system of claim 2, wherein the centralized driver behavior-grading unit includes a centralized driver grading module operative to weight unsafe acts for grading the driver of the self-vehicle and for outputting a self-vehicle driver risk grade.

4. The system of claim 2, wherein the additional classifier includes a first module operative to identify when the self-vehicle crosses a path of another vehicle and to output a first output.

5. The system of claim 4, wherein the additional classifier further includes a second module operative to identify when the self-vehicle enters a lane ahead of the remote vehicle and to output a second output.

6. The system of claim 4, wherein the additional classifier further includes a third module operative to identify when the self-vehicle enters an opposite lane while a remote vehicle is driving in the opposite lane and to output a third output.

7. The system of claim 2, wherein the additional classifier further includes a potential interaction unit operative to combine one or more of the first, second and third outputs and to issue an indication when one of the respective modules identifies a potential influenced vehicle.

8. The system of claim 2, wherein the detection of the at least one unsafe act is based on a speed pattern.

9. The system of claim 1, further comprising an in-vehicle logging unit that runs a log of self-vehicle unsafe acts.

10. A method for evaluating driver risk, comprising: in a self-vehicle communicating with a remote vehicle via vehicle-to-everything (V2X) communications, the self-vehicle and the remote vehicle having respective drivers,
checking if the remote vehicle had a major speed decrease in a recent given time period;
if yes, checking if the self-vehicle influences the remote vehicle;
if yes, checking respective speed patterns of the self-vehicle and of the remote vehicle for patterns typical for at least one unsafe act;
if patterns typical for at least one unsafe act are found, grading the at least one unsafe act; and
based on the grading the at least one unsafe act, grading the driver of the self-vehicle for risk.

11. The method of claim 10, further comprising, if the patterns typical for at least one unsafe act are found, declaring the at least one unsafe act and logging the at least one unsafe act in a log.

12. The method of claim 11, further comprising checking all unsafe acts logged in the log and ignoring unsafe acts where the self-vehicle has right-of-way based on a map.

* * * * *